Oct. 11, 1932.   R. H. LAWSON   1,882,430
KNITTING STITCH MEASURING MECHANISM AND PROCESS
Filed Dec. 26, 1928   5 Sheets-Sheet 1
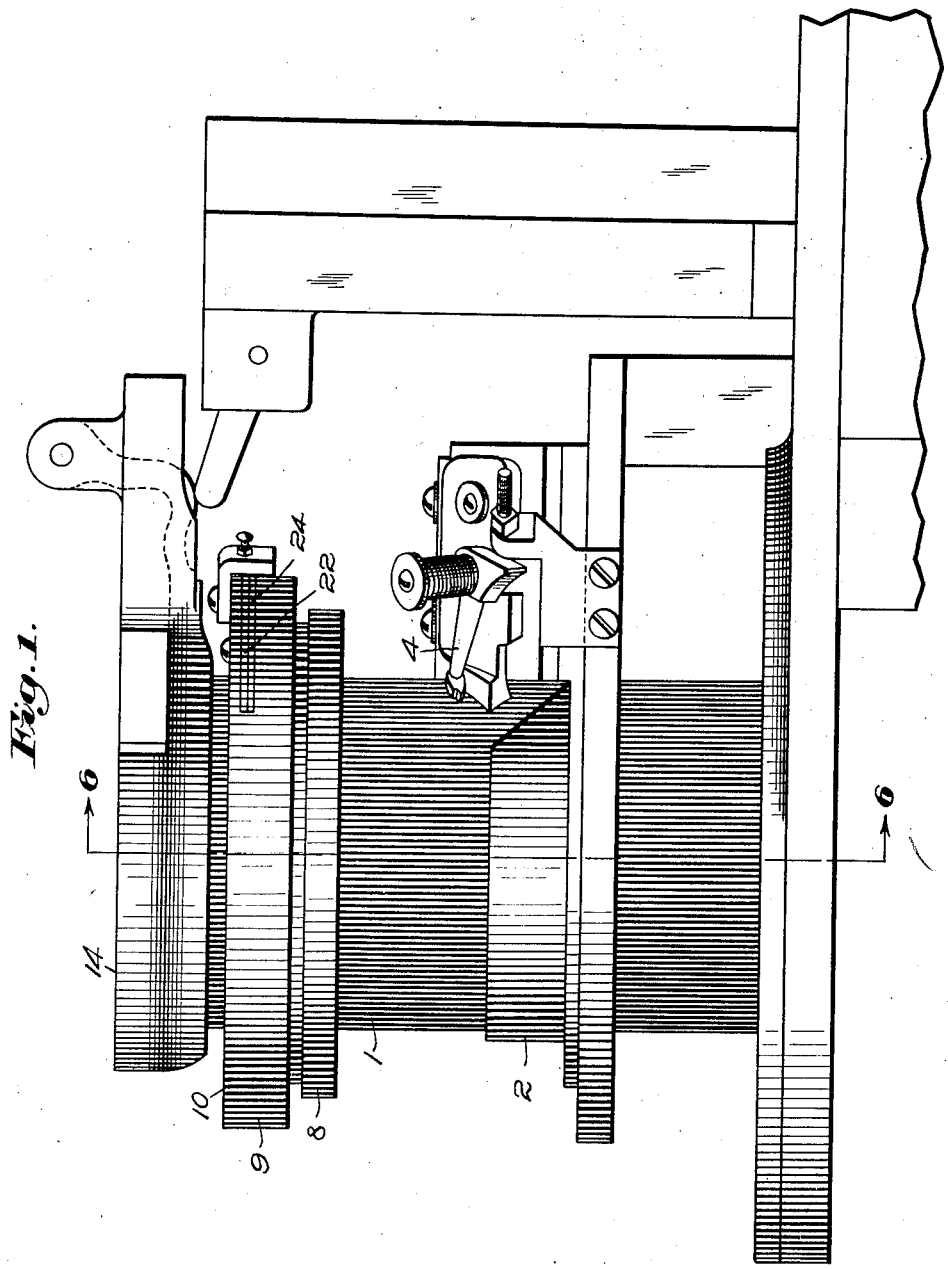

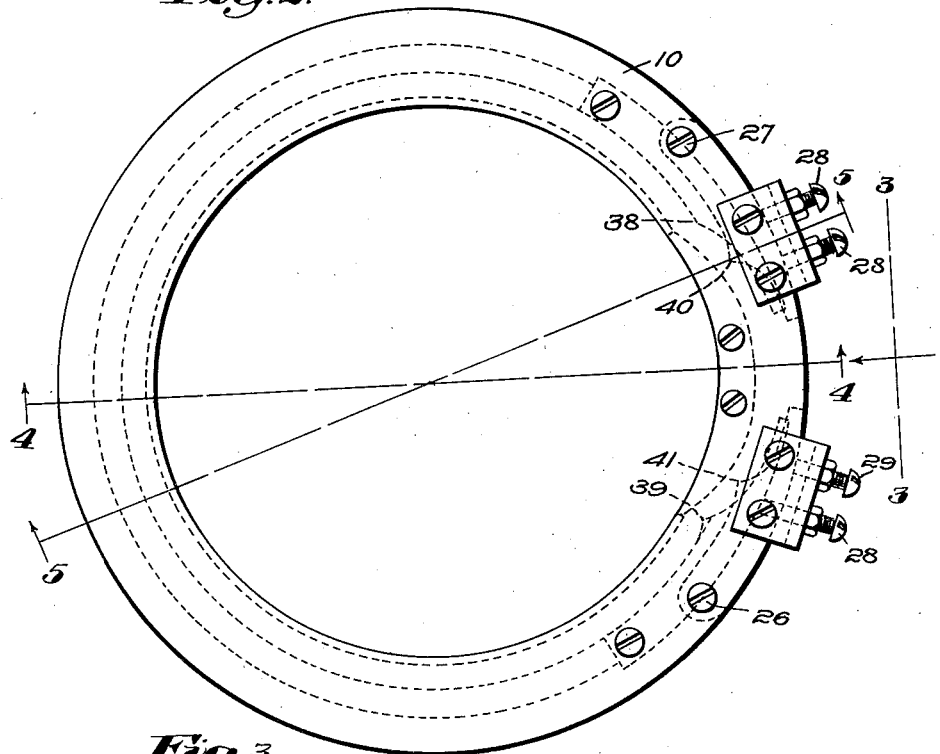
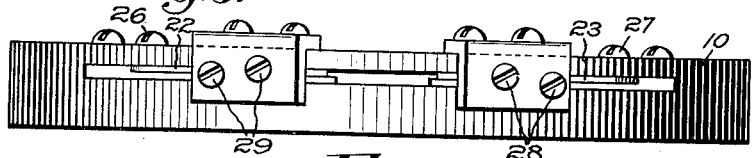
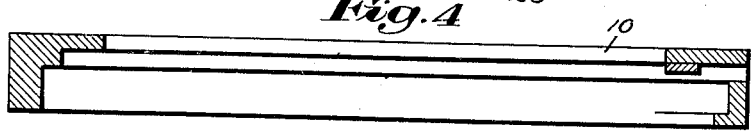
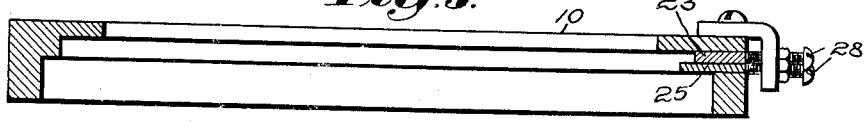

Oct. 11, 1932.                R. H. LAWSON                1,882,430
           KNITTING STITCH MEASURING MECHANISM AND PROCESS
                   Filed Dec. 26, 1928        5 Sheets-Sheet 3
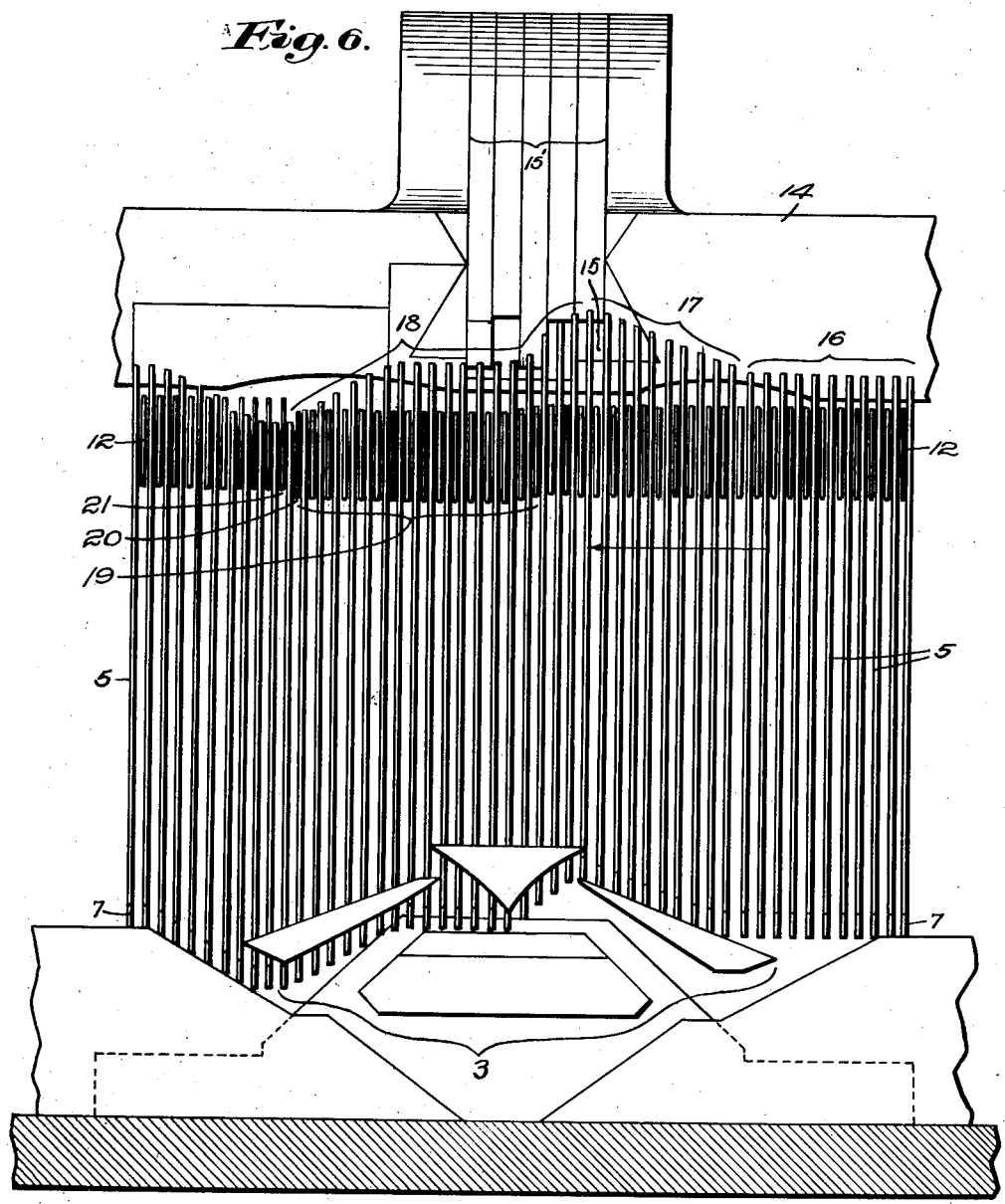
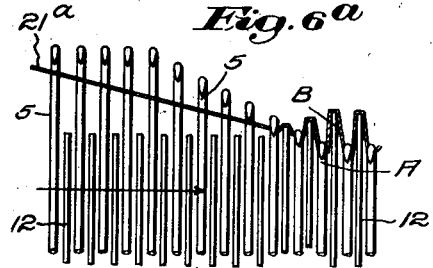
Inventor:
Robert H. Lawson,
by Emery, Booth, Janney and Varney
                                Attys.

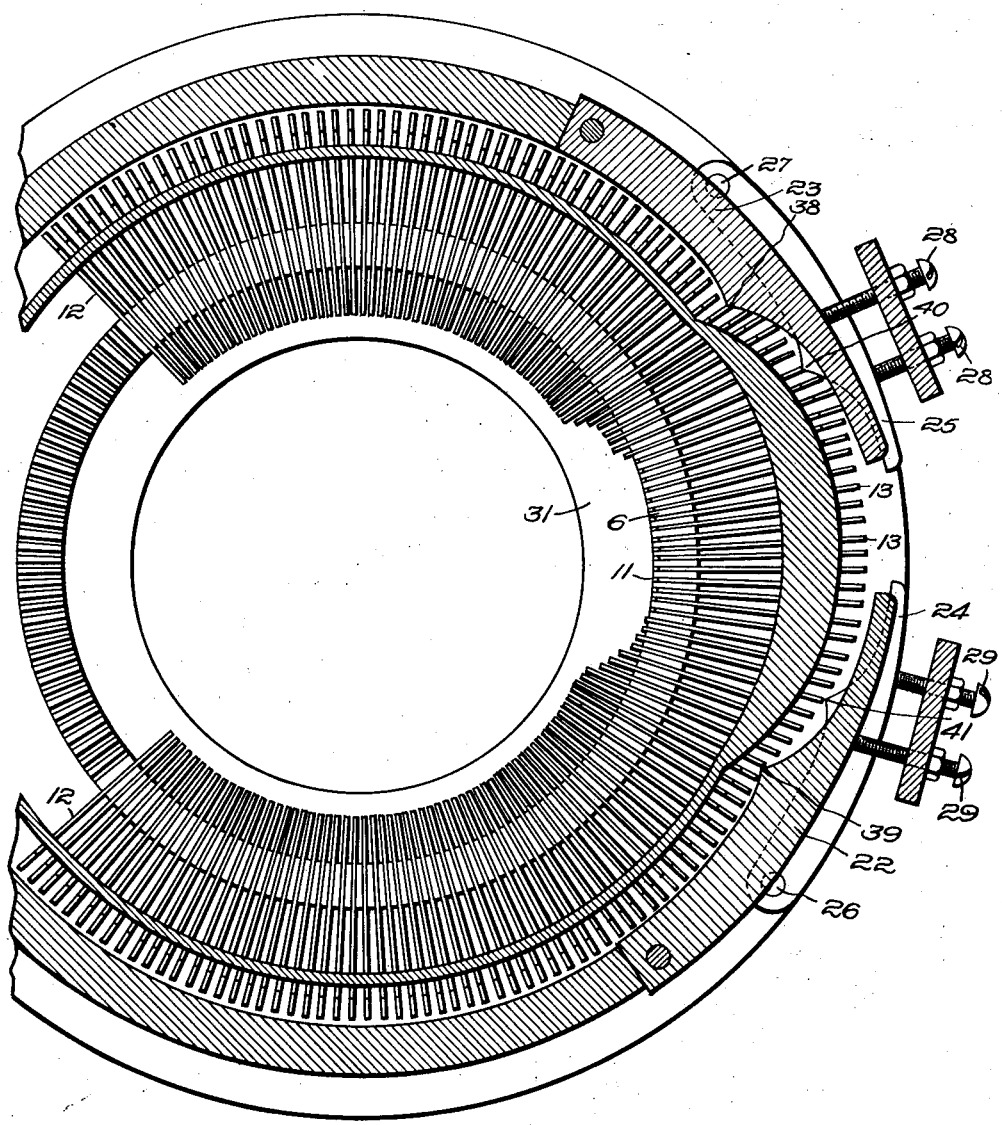

Oct. 11, 1932.  R. H. LAWSON  1,882,430
KNITTING STITCH MEASURING MECHANISM AND PROCESS
Filed Dec. 26, 1928   5 Sheets-Sheet 5
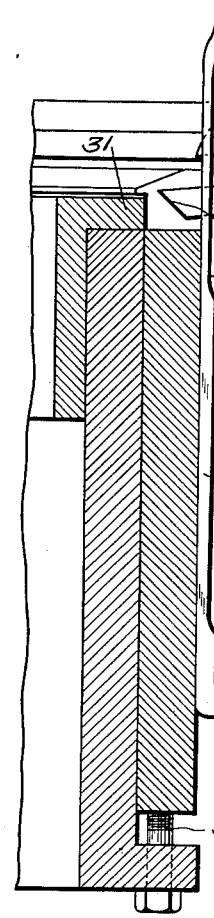
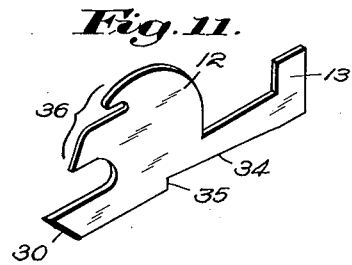
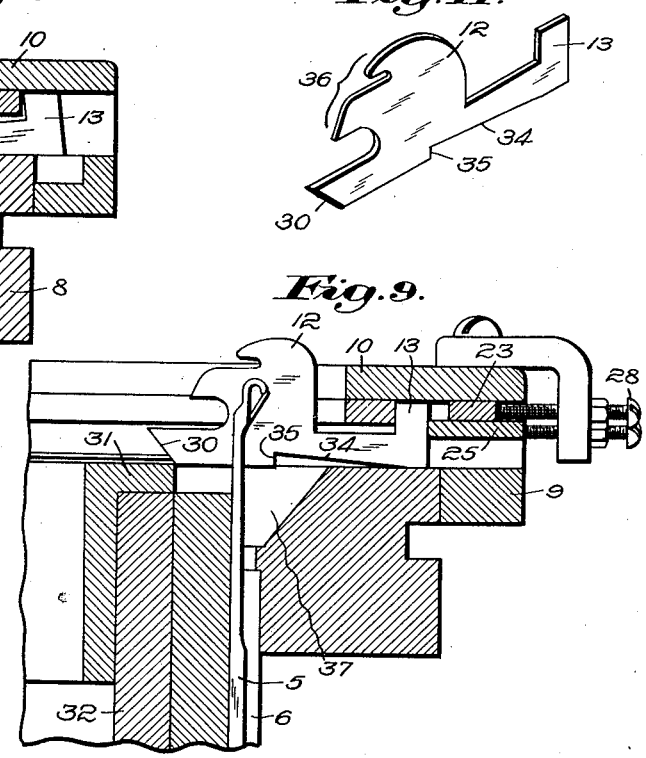
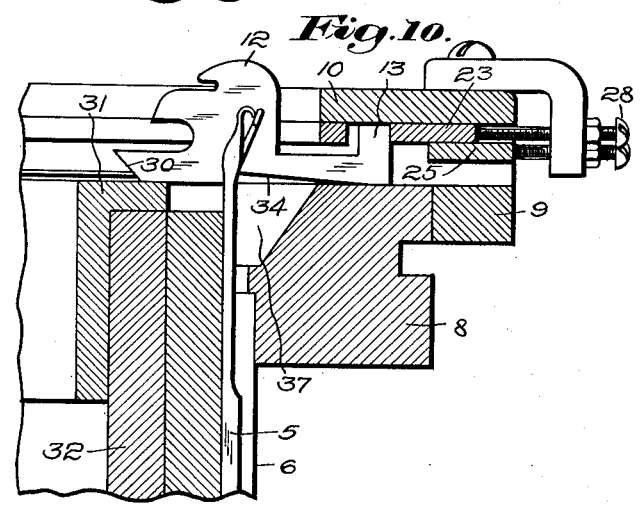
Inventor:
Robert H. Lawson
by Emery, Booth, Janney and Varney
Attys.

Patented Oct. 11, 1932

1,882,430

UNITED STATES PATENT OFFICE

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS

KNITTING STITCH MEASURING MECHANISM AND PROCESS

Application filed December 26, 1928. Serial No. 328,357.

This application is a continuation and refiling of my co-pending application Serial No. 304,786, filed September 8, 1928, as to all common subject matter.

This invention relates to mechanisms for and processes of measuring stitches in the formation of knitted fabrics.

In order that the principle of the invention may be readily understood, I have in this application illustrated in detail one type of mechanism embodying my invention and by which the process may be carried out.

Referring to the drawings wherein one type or form only of the invention is illustrated:—

Fig. 1 is a front elevation of the upper part of the knitting machine embodying my invention;

Fig. 2 is a plan view of the sinker cap of the machine;

Fig. 3 is an end view of the construction shown in Fig. 2 looking in the direction of the arrow drawn transversely on the line 3—3 at the right of Fig. 2;

Fig. 4 is a vertical section of the construction shown in Fig. 2, upon the line 4—4 of Fig. 2 and looking toward the top of the figure;

Fig. 5 is a vertical section upon the line 5—5 of Fig. 2 looking toward the top of the sheet;

Fig. 6 is a development of the inside of the latch ring and knitting cams and showing certain of the needles and sinkers in the positions they assume in stitch drawing in accordance with my invention;

Fig. 6a is a detail of the stitch measuring, looking at the outside of the needle cylinder;

Fig. 7 is a plan, partly in horizontal section, of the needle cylinder, the sinker ring and the sinker cams on the sinker cap;

Fig. 8 is an enlarged vertical section taken through a part of the needle cylinder, the sinker cap and sinker ring and showing one of the sinkers withdrawn to outer position and tilted downward;

Fig. 9 is a view similar to Fig. 8 but showing the sinker moved forward and tilted upward to normal position, the needle being partially lowered;

Fig. 10 is a view similar to Fig. 9 but showing the sinker moved all the way in and the adjacent needle in lowest position; and Fig. 11 is a perspective view of the sinker or web holder.

In accordance with my invention I measure each stitch by the conjoint and essentially simultaneous movement of the needle and some other element which has an independent movement of its own. I am enabled by so doing, to have an easier slope of the knitting cams, and I am enabled to knit at a very considerably higher speed and to knit yarns which heretofore it has been possible to use only with extreme care, as, for example, yarns having knots or other imperfections, and/or yarns which are tender or liable to very easy breakage.

It has been proposed to rely to a certain extent upon an inclined edge of a sinker in the formation of stitches. Such proposal so far as I can ascertain has never gone into practical use, and I believe it to be entirely impractical because such an edge would necessarily act to sever the yarn or thread.

Referring first to that form of the invention herein illustrated, it is to be understood that the invention may be carried out in many different types of knitting machines, whether the same be circular or straight or of other construction, and many different types of needles may be employed provided they are of an independent character. The needles may be of the latch type, spring beard type or of a sliding latch type, or other construction known in the art. In all cases the needle must have a movement of its own, but it is to be understood that the movement, for the purpose of participating in measuring the stitch, need not be the usual stitch forming movement of the needle. Preferably, however, and as herein shown, the movement of the needle whereby it participates in the stitch measuring is the movement thereof by which the thread or yarn is drawn by the needle as in the usual circular knitting machine. As already stated, such movement of the needle may be provided for by easier or less abrupt slopes of the knitting cams, and the needle may be drawn down to a less extent than heretofore, inasmuch as the balance or remainder of the stitch measuring function is performed by some other instrumentality, such other instrumentality in the illustrated form of the invention being a sinker or web holder. I do not herein disclose in detail other forms of my broad invention, but I reserve the right to file divisional, continuing or other applications specifically disclosing and claiming the same.

Without in any way limiting myself thereto, I have selected, merely as a type or example, a circular form of knitting machine having independent latch needles. In the figures of the drawings, I have represented at 1 the needle cylinder of a so-called Banner knitting machine of the general type shown in the patent to Hemphill No. 933,443. The said machine is provided with a cam ring or carrier 2, the knitting cams whereof, as illustrated generally at 3 in Fig. 6, may be of less abrupt slope. The machine may be adapted to knit a fabric of any character, whether tubular or straight for whatever the purpose of the fabric may be. I have, however, selected for illustration a hosiery machine, and in Fig. 1 I have indicated at 4 a part of the narrowing mechanism. It is immaterial whether the needle carrier or the knitting cams be moved, a relative movement of the two being all that is necessary. I have, however, chosen to illustrate a machine wherein the needle carrier, herein a cylinder, is rotated and desirably at times reciprocated. The cam carrier (herein a ring) is stationary. The needles, which are of an independent type, are represented at 5 in the several views, and in this form of my invention they are of the latch type. They are adapted to be vertically reciprocated between the stationary walls 6 of the needle cylinder and their butts 7 are engaged by the knitting cams in a manner well known in the art. Obviously, if desired, jacks may be provided to cooperate with the needles in imparting the stitch forming movement thereto. Inasmuch as such construction is old and common in the art, it is unnecessary to refer thereto.

The machine is provided with a sinker head 8 surrounding which is a sinker ring 9 and a sinker cap 10. The sinker ring is provided with radial grooves indicated at 11 wherein are received the sinkers or web holders 12. I use the term "sinker" in this application, in a broad sense to include not only sinkers or web holders but like instrumentalities. The sinkers are provided with suitable butts 13 which, if desired, may be of shape or form contrasting among themselves when some particular type of knitted fabric is required or for other purpose. The invention is in no wise limited to a knitted fabric which is of invariable character throughout, as there may be stitch variations in the fabric of different characters, such, for example, as tuck stitches, reverse plaiting stitches normal plaiting stitches, reinforce stitches, enlarged loop stitches, split work fabric and other stitch variations not necessary to refer to in detail.

The machine selected for illustration is provided with a latch ring 14, which desirably is pivoted as in the Banner machine, and herein it is provided with a throat 15 into which any one or more of the yarn fingers 15' may be brought in a manner well understood in the art. In Fig. 6 I have indicated at 16 the series of needles as they are moving at the same level toward the yarn receiving position. At 17, I have indicated needles rising in usual manner in the vicinity of the throat of the latch ring, and at 18 I have indicated the positions assumed by the needles during the receiving of the thread and the drawing of the stitch in casting off the same. The downward movement of the needles to the casting off point may be and desirably is less than heretofore, inasmuch as the stitch measuring is done only partly by the needles.

The sinkers or web holders which also participate in the stitch measuring have a movement of their own in such participation, and in the group of sinkers indicated at 19 in Fig. 6 I have indicated the depression of the sinkers in the stitch measuring, such depression being indicated in side elevation in Fig. 8. 20 in Fig. 6 indicates the last low sinker and at 21 in Fig. 6, and in Fig. 9 I have indicated the elevated or what may be referred to as the usual position of the sinkers when the stitch measuring is completed, the lead line for the numeral 21 indicating the first elevated sinker.

Viewing Fig. 6, it is clear that the said movements of the sinkers or web holders all occur before the casting off point is reached.

In Fig. 6a, I have represented the stitch measuring action, the infeeding yarn being represented at 21a. The lowest needle is indicated at A and the first elevated sinker (of the group or position 21) is indicated at B.

While in Figs. 8, 9 and 10 I have represented a sliding sinker which has an up and down movement, due to a wedge action, it is to be understood that my invention is in no sense limited to such movement or type of movement of the sinker, as some other movement of the sinker may be employed.

Referring to the mechanism for supporting and operating the sinkers, it will be noted that in this type or embodiment of the invention, I have represented two top cams 22, 23, clearly shown in Fig. 7, and two corresponding bottom cams 24, 25. Said bottom cams are here shown as pivoted at 26, 27, and at 28 and 29 respectively there are shown adjusting and set screws by which the position of said cams may be very accurately determined. Such adjusting and set screws are shown also in Figs. 9 and 10.

The construction of the sinker or like instrumentality is clearly shown in Figs. 8 to 11. It is provided with a downwardly and outwardly beveled inner end 30 which, in the inward movement of the sinker, rides upon an inside ring or sleeve 31, which is here shown as supported upon a longer sleeve 32 inside the needle cylinder. Screws 33 are provided, by means of which the relative vertical position of the needle cylinder and the ring 31 may be very accurately adjusted.

The sinker or like instrumentality 12 is also provided with an upwardly sloped lower edge portion 34 terminating in the shoulder 35 to permit of the described movement. The nib construction 36 of the sinker may, of course, be widely varied within the scope of my invention. In the measuring of the stitch, the part of the sinker or web holder that receives the yarn for the stitch measuring may be any suitable part of the sinker,—that is, any edge portion thereof over which the yarn or thread may pass or be supported in the stitch measuring. My invention is not limited in this respect.

In Fig. 8, the sinker 12 is shown in its outward position, and it will be observed that the sinker bed 8 is recessed annularly, as indicated at 37, to permit the downward movement of the sinker into the position shown in Fig. 8. As the sinker moves inwardly under the influence of the cam or cams, it next comes into the position shown in Fig. 9, the sinker, being here shown as raised through the action of the beveled edge 30, sliding upward under the shoulder of the ring 31. In such position of the parts the needle 5 has been drawn downward in the loop drawing operation, but has not yet reached its casting off position.

In Fig. 10, the needle 5 is represented as wholly down, and the sinker 12 is represented as moved wholly inward.

Viewing Figs. 2, 7, 9 and 10, it will be observed that in this embodiment of the invention, the functioning points 38, 39 of the top cams are more widely separated circumferentially than are the functioning points 40, 41 of the bottom cams, and it will be understood that in either direction of rotation of the needle cylinder the butts 13 of the sinkers 12 are the first engaged by the proper bottom cam, as shown in Fig. 9, and the sinker is thus moved inward to effect the stitch measuring function. Such stitch measuring function is completed, so far as the sinker is concerned, when the point 40 or 41 is reached, depending upon the direction of needle cylinder movement. Thereafter, the further inward movement of the sinker in completing the stitch and casting off the same is effected by the top cam, as shown in Fig. 10, and when the point 38 or 39 is reached, the sinker is moved entirely inward.

In that form of the invention shown in the drawings the stitch measuring, in so far as the same is participated in by the sinkers or web holders, is accomplished by an inward movement of the sinkers, but my invention is not limited to that form thereof which I have chosen to illustrate as an example, it being, however, the preferred embodiment of the invention.

For this purpose each sinker has an edge or portion adapted to engage the stitch as each stitch is drawn by the needle corresponding to the sinker. The edge or portion of each said sinker may be vertically disposed or positioned so as thereby to engage the stitch and draw the same against a corresponding needle shank as the said needle draws the stitch down against a horizontal portion or edge of the sinker. Other forms or types of sinkers or like instrumentalities and other movements thereof may be employed by me within the broad scope and purpose of my invention, but it is unnecessary for me to disclose the same in detail in this application.

I have referred to downward movement of the needles, but it is obviously to be understood that by "downward" I mean simply a movement of the needle to draw the stitch, and such movement may, according to the type of machine, be a downward or upward or inward or outward movement.

Referring to the forms of my invention wherein the sinker, web holder or like instrumentality participates in the stitch measuring, the movement of the sinker or web holder is an up or down movement or other suitable movement whereby such movement and a movement of the corresponding needle causes the two elements referred to to participate in effecting the stitch measuring. These two movements are essentially simultaneous in their occurrence or substantially so, though my invention is not limited to the two movements as occurring absolutely or exactly in the same time interval.

In the proposal made in the prior art, to which I have referred, in the inward movement of so-called sinker bars, the forming stitch would necessarily be subjected to a shearing action by the inclined edge, not only tending to but also inevitably severing or rupturing the stitches or such a substantial proportion thereof as to make the resulting fabric wholly useless commercially. In that form of my invention herein illustrated and referring particularly to Figs. 8 and 9 of the drawings hereof, it will be understood that the yarn or thread of the stitch is not subjected to a shearing or rupturing action, but on the contrary the sinker or a part thereof is lifted or pulled so as to lift or move with it the forming stitch. Thus, there is no tendency to rupture the stitch in the stitch measuring operation.

It will be evident from an inspection of the figures of the drawings that the sinkers are caused to move to such a position that the tips of the sinker nibs will be adjacent the needles, such movements of the sinkers occurring between the time the needles draw the yarn below the tips of the sinkers and the time the stitches are drawn, the yarn thereby passing above the nibs of the idle instep sinkers. The sinkers are moved to such a position that the tips of the sinker nibs will be adjacent the needles immediately after the yarn is drawn below said sinker nibs. This will be evident from a consideration of Figs. 6 to 10 inclusive. It will also be evident that the casting-off point is remote from the stitch drawing point.

It will be observed, viewing Fig. 6, that the drawing down cams are arranged with their lower butt-engaging edges at less than 45° to the horizontal, thus giving a longer space of time for closing the needle latches. Consequently, the stitches as they close the latches are not subjected to as great a strain as would be the case if the usual strain of a 45° slope were employed. It will be observed that the means for moving the sinkers in a vertical path (namely, the sloping edge 30) is located adjacent to or at the extreme forward or inner ends of the sinkers. This provides for a more accurate control of the upward throw of the sinkers than would be the case if the means for moving the sinkers vertically were located at a distance from the said inner ends because in the latter case slight variations in the throw of the sinker butts are multiplied into an undue or incorrect amount at the stitch measuring edge of the sinkers. It will also be observed that the sinkers are normally depressed and then are raised to a horizontal position to measure and/or to cast off the stitches.

It will also be observed that the needles descend to a level which is a short distance only below the edges of the adjacent sinkers. This is evident from a consideration of Fig. 10, which shows the lowest position of the needles.

It will also be observed, viewing Figs. 7, 9 and 10, that the sinkers are brought inward or forward at a somewhat earlier period in the stitch forming cycle than is necessary for casting off (although the sinkers are not moved all the way in at said early period), in order that the thread will pass over the nibs of the sinkers during the heel and toe knitting.

Having thus illustrated and described one embodiment of my invention and having described without illustrating certain modifications or variations thereof, it is to be understood that although specific terms are employed, they are used in a generic and descriptive sense and not for purposes of limitation, the scope of the invention being set forth in the following claims.

I claim:

1. In a knitting machine, a series of independent needles and a series of elements individually co-acting with said needles respectively in measuring the stitches, and means simultaneously to impart stitch measuring movements both to the needles and to said elements, thereby to measure the stitches while preserving the same from rupture the means for imparting the stitch measuring movements to said elements being located closely adjacent the forward or inner ends of said elements.

2. In a knitting machine, a series of independent needles and a series of sinkers or like instrumentalities individually positionable during operation between the needles, and co-acting therewith respectively in measuring the stitches and in preserving them from rupture, and means to impart stitch measuring movement both to said needles and to said instrumentalities, thereby through their conjoint movement to preserve the stitches from rupture and to measure the same, the means to impart stitch measuring movement to said instrumentalities being located immediately adjacent the forward end of said instrumentalities.

3. In a knitting machine, a series of independent needles, and a series of sinkers or like instrumentalities individually positionable during operation between the needles and co-acting therewith respectively in measuring the stitches and in preserving them from rupture, means to lift said instrumentalities while in engagement with the yarn so that said instrumentalities participate in the stitch measuring, means to cause the needles to participate in the loop measuring by movement relative to the normal position of the sinkers, and means to move said instrumentalities inward at an abnormally early period in the stitch forming cycle than is necessary for casting off.

4. In a knitting machine, a series of independent needles and a series of sinkers or like instrumentalities individually positionable during operation between the needles and co-acting therewith respectively in measuring the stitches and in preserving them from rupture, means to move said instrumentalities inward with respect to the series of needles and also lengthwise the needles thereby causing said instrumentalities to participate in the stitch measuring and means to cause the needles to participate in the loop measuring by movement relative to the normal position of the sinkers, the needle depressing cams having their drawing down edges arranged at an angle less than forty-five degrees to the horizontal.

5. In a circular knitting machine, a circular series of independent needles and a corresponding series of sinkers or like instrumentalities individually positionable during operation between the needles and co-acting therewith respectively in measuring the stitches and in preserving them from rupture, means to impart stitch measuring movement both to said needles and to said instrumentalities, thereby to measure the stitches while preserving them from rupture and means to cause the needles to participate in the loop measuring by movement relative to the normal position of the sinkers, the means for causing the stitch measuring participation movement of the instrumentalities being located immediately adjacent the forward ends of said instrumentalities.

6. In heel and toe (or reciprocating) knitting, needles and sinkers, said sinkers having nibs, means closely adjacent the inner ends of the sinkers to control the sinkers partly to draw the stitches without rupture of said stitches, the needle wave at the stitch drawing assuming an angle of about thirty degrees to the horizontal.

In testimony whereof, I have signed my name to this specification.

ROBERT H. LAWSON.